United States Patent
Nho et al.

(10) Patent No.: US 10,882,954 B2
(45) Date of Patent: Jan. 5, 2021

(54) TERTIARY ALKOXY POLYETHYLENE GLYCOL AND DERIVATIVES THEREOF

(71) Applicant: SUNBIO INC., Gyeonggi-do (KR)

(72) Inventors: Kwang Nho, Gyeonggi-do (KR); Min Jung Ahn, Gyeonggi-do (KR); Junghoon Lee, Gyeonggi-do (KR); Changmin Hyun, Gyeonggi-do (KR)

(73) Assignee: SUNBIO INC., Gyeonggi-do (KR)

(*) Notice: Subject to any disclaimer, the term of this patent is extended or adjusted under 35 U.S.C. 154(b) by 81 days.

(21) Appl. No.: 16/381,499

(22) Filed: Apr. 11, 2019

(65) Prior Publication Data

US 2020/0325274 A1    Oct. 15, 2020

(51) Int. Cl.
| | |
|---|---|
| *C08L 71/02* | (2006.01) |
| *C08G 65/332* | (2006.01) |
| *C08G 65/333* | (2006.01) |
| *C08G 65/334* | (2006.01) |

(52) U.S. Cl.
CPC ..... *C08G 65/3322* (2013.01); *C08G 65/3326* (2013.01); *C08G 65/3328* (2013.01); *C08G 65/3342* (2013.01); *C08G 65/33306* (2013.01); *C08G 65/33331* (2013.01); *C08L 71/02* (2013.01); *C08L 2203/02* (2013.01)

(58) Field of Classification Search
CPC .................................................. C08G 65/3322
USPC ........................................................... 528/425
See application file for complete search history.

(56) References Cited

U.S. PATENT DOCUMENTS

| | | |
|---|---|---|
| 5,478,806 A | 12/1995 | Nho |
| 5,985,265 A | 11/1999 | Kinstler et al. |
| 6,113,906 A | 9/2000 | Greenwald et al. |
| 6,774,180 B2 | 8/2004 | Kozlowski et al. |
| 6,828,401 B2 | 12/2004 | Nho et al. |
| 6,956,135 B2 | 10/2005 | Rosen et al. |
| 7,041,855 B2 | 5/2006 | Rosen et al. |
| 7,781,563 B2 | 8/2010 | Park et al. |
| 8,329,191 B2 | 12/2012 | Jo et al. |
| 8,952,205 B2 | 2/2015 | Tsai et al. |

OTHER PUBLICATIONS

Abuchowski A. et al., "Effect of covalent attachment of polyethylene glycol on immunogenicity and circulating life of bovine liver catalase", 1977 J Biol Chem 252:3582-3586 (6 pages).

*Primary Examiner* — Duc Truong
(74) *Attorney, Agent, or Firm* — Osha Bergman Watanabe & Burton LLP

(57) ABSTRACT

Disclosed are a novel monofunctional polyethylene glycol (PEG) and derivatives thereof. More particularly, one terminal of each of the monofunctional polyethylene glycol and derivatives thereof is modified with a tertiary alkoxy group.

10 Claims, No Drawings

TERTIARY ALKOXY POLYETHYLENE GLYCOL AND DERIVATIVES THEREOF

BACKGROUND OF THE INVENTION

1. Field of the Invention

The present disclosure relates to monofunctional polyethylene glycol having one terminal modified with a tertiary alkoxy group, and derivatives thereof.

2. Discussion of Related Art

Polyethylene glycol (PEG), which is a polymeric substance represented by a general formula, H—$(OCH_2CH_2)_n$—OH, is used in various fields such as binders, solvents, plasticizers, and cosmetic ingredients. In particular, since PEG hardly induces an immune response in the human body and is non-toxic, it is widely used for modification (PEGylation) of medicines such as biopharmaceuticals to improve the half-life of medicines, absorption into the body, and the like.

The technology of PEGylation has been successfully used in many pegylated biopharmaceuticals since the first pioneering work by Abuchowski et al. (1977 J Biol Chem 252:3582-3586).

One such example of US FDA-approved pegylated biopharmaceutical is PEG-filgrastim which is a treatment for neutropenia in cancer patients undergoing chemotherapy, as described in U.S. Pat. No. 5,985,265 by Kinstler et al.

Pegylation is an art of attaching PEG molecule to a target such as biopharmaceutical. The methoxy PEG has been the choice of raw material, of which one end is capped with a methoxy group ($CH_3O$—), with the other end featuring a hydroxyl group (—OH). The methoxy PEG may be generally depicted as,

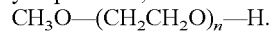

The hydroxyl end of the methoxy PEG can then be derivatized through a series chemical synthesis reactions into a functional group, which may be generally depicted as, $CH_3O$—$(CH_2CH_2O)_n$-functional group.

The functional group will react with one of the amino acids of the target to yield a PEG-target conjugate, which may be generally depicted as,

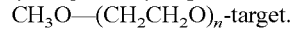

U.S. Pat. No. 5,478,806 discloses a composition of pegylated hemoglobin which is intended to oxygenate hypoxic tumor cells in order to render them more susceptible to chemotherapy or radiation therapy. In it, the pegylated hemoglobin was pegylated with methoxy PEG succinimidyl carbonate. The raw material PEG used in this invention was methoxy PEG.

U.S. Pat. No. 5,985,265 discloses a pegylated G-CSF which is treatment for neutropenia of cancer patients receiving chemotherapy. The pegylated G-CSF was pegylated with methoxy PEG aldehyde. The raw material PEG used in this invention was methoxy PEG.

U.S. Pat. No. 6,113,906 discloses branched, non-antigenic PEGs. Conjugates prepared with the polymers and biologically active molecules such as proteins and peptides demonstrate extended circulating life in vivo. Substantially fewer sites on the biologically active material are used as attachment sites. The raw material PEG used in this invention was methoxy PEG.

U.S. Pat. No. 6,774,180 disclosed high molecular weight derivatives of activated PEG and the like polymers prepared in high purity by conjugating a large PEG molecule to a small PEG molecule. The raw material PEG used in this invention was methoxy PEG.

U.S. Pat. No. 6,828,401 discloses novel synthetic methods for PEG-maleimide derivatives useful as a pegylation reagent in the field of bioengineering and the medicinal field by conjugating with certain moieties or specific domains of polysaccharides and biological proteins such as antibodies as abio-compatible or bio-degradable polymer. The raw material PEG used in this invention was methoxy PEG.

U.S. Pat. No. 6,956,135 discloses novel monofunctional PEG aldehydes for the pegylation of therapeutically active proteins. The pegylated protein conjugates that are produced, retain a substantial portion of their therapeutic activity and are less immunogenic than the protein from which the conjugate is derived. The raw material PEG used in this invention was methoxy PEG.

U.S. Pat. No. 7,041,855 discloses novel monofunctional PEG aldehydes with a linker moiety between the PEG backbone and the functional aldehyde group, which is useful for the pegylation of therapeutically active proteins. The raw material PEG used in this invention was methoxy PEG.

U.S. Pat. No. 7,781,563 discloses method of preparation of methoxy PEG with high purity and derivatives thereof, specifically the method of preparation of high purity methoxy PEG with at least 99% of purity, up to 1.05 of molecular weight distribution and up to 100,000 of molecular weight at commercial scale. The PEG used mentioned in this invention was methoxy PEG.

U.S. Pat. No. 8,329,191 discloses three-branched PEG-G-CSF conjugate. The raw material PEG used in this invention was methoxy PEG.

U.S. Pat. No. 8,952,205 discloses method for producing methoxy PEG by (1) preparing a reactor by washing the reactor with water; pressurizing the reactor with nitrogen; and evacuating to completely remove water and reduce oxygen content in the reactor; (2) pressurizing the reactor with nitrogen, introducing ingredients including methanol and a catalyst comprised of sodium methoxide in methanol into the reactor, and heating the ingredients; (3) introducing ethylene oxide into the reactor at a rate of 800-1200 kg/h and reacting the methanol and the ethylene oxide to completely react the methanol; (4) introducing additional ethylene oxide into the reactor at a rate of 8000-12000 kg/h to continue the reaction and provide final reaction products; (5) reducing the pressure in the reactor and adjusting pH of the reaction. The PEG mentioned in this invention was methoxy PEG.

As illustrated by the prior arts, methoxy PEG has been used in the making of monofunctional PEG derivatives, possibly due to the fact that methoxy PEG has been the only commercially available mono-capped PEG raw material.

SUMMARY OF THE INVENTION

Therefore, the present disclosure has been made in view of the above limitations, and it is an object of the present disclosure to provide a novel monofunctional polyethylene glycol for PEGylation of proteins, peptides, other drugs, and the like, and derivatives thereof.

In accordance with the present disclosure, the above and other objects can be accomplished by the provision of tertiary alkoxy PEG represented by Formula 1 below and derivatives thereof:

[Formula 1]

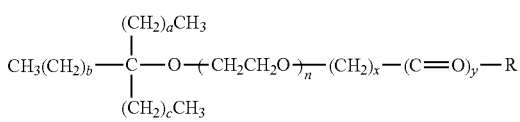

wherein a, b and c are independently an integer of 0 to 10,
n is an integer of 2 to 10,000,
x and y are independently an integer of 0 to 10; and
R is selected from the group consisting of hydrogen, a substituted or unsubstituted vinyl group, an amine group, a C2-C20 heterocyclic group, and a thiol group.

DETAILED DESCRIPTION

Hereinafter, the present disclosure is described in more detail.

All technical terms used in the present disclosure have the meanings as commonly understood by those of ordinary skill in the relevant field of the present disclosure unless otherwise defined. In addition, exemplary methods or samples are described in this specification, but similar or equivalent ones are also included in the scope of the present disclosure. The contents of all publications disclosed as reference documents in this specification are incorporated herein by reference in their entirety.

An aspect of the present disclosure provides tertiary PEG represented by Formula 1 below and derivatives thereof:

[Formula 1]

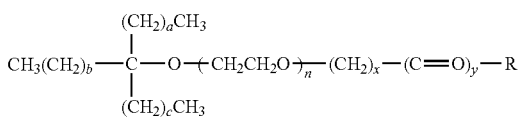

wherein a, b and c are independently an integer of 0 to 10,
n is an integer of 2 to 10,000,
x and y are independently an integer of 0 to 10; and
R is selected from the group consisting of hydrogen (H), a substituted or unsubstituted vinyl group, an amine group, a C2-C20 heterocyclic group, and a thiol group.

"Alkoxy," used in this specification, refers to an alkyl to which oxygen is bonded. As the simplest forms of alkoxy, there are methoxy ($CH_3O-$), ethoxy ($C_2H_5O-$), propoxy ($C_3H_7O-$), butoxy ($C_4H_9O-$), pentyloxy ($C_5H_{11}O-$), hexyloxy ($C_6H_{13}O-$), and the like, the number of carbon atoms of which is different. Meanwhile, "tertiary alkoxy" refers to alkoxy having three alkyls.

In accordance with an embodiment of the present disclosure, a compound represented by Formula 1 is tertiary butoxy when each of a, b, and c in Formula 1 is 0, and a compound represented by Formula 1 is 3-ethyl-3-pentoxy when each of a, b, and c in Formula 1 is 1.

In accordance with an embodiment of the present disclosure, in Formula 1,
a, b and c may be independently an integer of 0 to 5,
n may be an integer of 2 to 10,000,
x and y may be independently an integer of 0 to 5; and
R may be selected from the group consisting of hydrogen, a substituted or unsubstituted vinyl group, an amine group, a C2-C20 heteroaryl group, a C2-C10 heterocyclic group, a C2-C10 cyclic imide group, a substituted or unsubstituted aryl group, a C2-C10 alkyl-(C=O)-succinimidyl group, and a thiol group.

In accordance with an embodiment of the present disclosure, in Formula 1,
a, b and c may be independently an integer of 0 to 3,
n may be an integer of 2 to 10,000,
x and y may be independently an integer of 0 to 3; and
R may be selected from the group consisting of hydrogen, a substituted or unsubstituted vinyl group, an amine group, a C2-C20 heteroaryl group, a C2-C10 heterocyclic group, a C2-C10 cyclic imide group, a substituted or unsubstituted aryl group, a C2-C10 alkyl-(C=O)-succinimidyl group, and a thiol group.

In accordance with an embodiment of the present disclosure, when x is 0 in Formula 1,
a, b and c may be independently an integer of 0 to 3,
n may be an integer of 2 to 10,000,
y may be an integer of 0 or 1; and
R may be selected from the group consisting of hydrogen, a substituted or unsubstituted vinyl group, a C2-C20 heteroaryl group, a C2-C10 cyclic imide group, a substituted or unsubstituted aryl group, and a C2-C10 alkyl-(C=O)-succinimidyl group.

Particularly, when x is 0 in Formula 1, a compound represented by Formula 1 may be any one of the following compounds: tertiary alkoxy PEG; tertiary alkoxy PEG-acrylate; tertiary alkoxy PEG-benzotriazolyl carbonate; tertiary alkoxy PEG-methacrylate; tertiary alkoxy PEG-nitrophenyl carbonate; tertiary alkoxy PEG-succinimidyl carbonate; tertiary alkoxy PEG-succinimidyl glutarate; and tertiary alkoxy PEG-succinimidyl succinate.

Particularly, when x is 0 and y is 0 in Formula 1, a compound represented by Formula 1 may be tertiary alkoxy PEG, for example, tertiary butoxy PEG or 3-ethyl 3-pentoxy PEG.

In addition, when x is 0 and y is 1 in Formula 1, a compound represented by Formula 1 may be tertiary alkoxy PEG-acrylate, tertiary alkoxy PEG-benzotriazolyl carbonate, tertiary alkoxy PEG-methacrylate, tertiary alkoxy PEG-nitrophenyl carbonate, tertiary alkoxy PEG-succinimidyl carbonate, tertiary alkoxy PEG-succinimidyl glutarate, or tertiary alkoxy PEG-succinimidyl succinate.

In accordance with an embodiment of the present disclosure, when x is 1 in Formula 1,
a, b and c may be independently an integer of 0 to 3,
n may be an integer of 2 to 10,000,
y may be an integer of 0 or 1; and
R may be a C2-C10 heterocyclic group or hydrogen.

Particularly, when x is 1 in Formula 1, a compound represented by Formula 1 may be any one of the following compounds: tertiary alkoxy PEG-aldehyde and tertiary alkoxy PEG-epoxide.

Particularly, a compound represented by Formula 1 may be tertiary alkoxy PEG-epoxide when x is 1 and y is 0 in Formula 1, and a compound represented by Formula 1 may be tertiary alkoxy PEG-aldehyde when x is 1 and y is 1.

In accordance with an embodiment of the present disclosure, when x is 2 in Formula 1,
a, b and c may be independently an integer of 0 to 3,
n may be an integer of 2 to 10,000,
y may be an integer of 0 or 1; and
R may be an amine group, a C2-C10 cyclic imide, a thiol group, or hydrogen.

Particularly, when x is 2 in Formula 1, a compound represented by Formula 1 may be any one of the following compounds: tertiary alkoxy PEG-amine; tertiary alkoxy PEG-maleimide; tertiary alkoxy PEG-sulfhydryl; tertiary alkoxy PEG-propionaldehyde; and tertiary alkoxy PEG-succinimidyl propionate.

Particularly, when x is 2 and y is 0 in Formula 1, a compound represented by Formula 1 may be tertiary alkoxy PEG-amine, tertiary alkoxy PEG-sulfhydryl, or tertiary alkoxy PEG-maleimide.

In addition, when x is 2 and y is 1 in Formula 1, a compound represented by Formula 1 may be tertiary alkoxy PEG-propionaldehyde or tertiary alkoxy PEG-succinimidyl propionate.

In accordance with an embodiment of the present disclosure, when x is 3 in Formula 1, a, b and c may be independently an integer of 0 to 3,
n may be an integer of 2 to 10,000,
y may be 1; and
R may be hydrogen.

Particularly, when x is 3 in Formula 1, a compound represented by Formula 1 may be tertiary alkoxy PEG-butyraldehyde.

In the present disclosure, the tertiary alkoxy PEG represented by Formula 1 may be synthesized to have a high molecular weight by continuously polymerizing low-molecular weight tertiary alkoxy PEG with PEG as disclosed in Examples 1 and 17 of the present disclosure. In particular, a tertiary alkoxy may be reacted with low-molecular weight PEG in the presence of potassium hydroxide, as a catalyst, to synthesize low-molecular weight tertiary alkoxy PEG as disclosed in Reaction Scheme 1-1 or 2-1 of the present disclosure. Subsequently, since processes of Reaction Schemes 1-2, 1-3, 2-2, and 2-3 may be additionally performed to synthesize high-molecular weight tertiary alkoxy PEG, the tertiary alkoxy PEG of the present disclosure may be synthesized without limitation on a molecular weight thereof.

In accordance with an embodiment of the present disclosure, the tertiary alkoxy PEG represented by Formula 1 may have a molecular weight (MW) of 100 to 500,000 Daltons (Da), preferably, a molecular weight of 400 to 100,000 Da, and more preferably, a molecular weight of 400 to 10,000 Da.

Accordingly, in Formula 1, n may be an integer of 2 to 10,000, preferably, an integer of 2 to 5,000, and more preferably, an integer of 2 to 1,000.

Hereinafter, the present disclosure will be described in more detail with reference to the following Examples. Those skilled in the art will appreciate that the scope of the present disclosure is not limited to the following Examples.

Example 1: Tertiary Butoxy PEG 5000 Synthesis 1-1. Tertiary Butoxy PEG 400 Synthesis Tertiary butoxy PEG 400 was synthesized according to Reaction Scheme 1-1 below:

[Reaction Scheme 1-1]

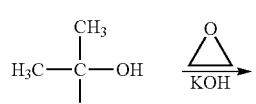

[Tertiary butanol]

-continued

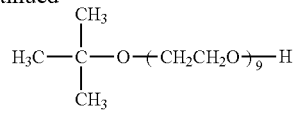

[Tertiary butoxy PEG 400]

In particular, a 10 L reactor was washed with water and dried, and then filled with nitrogen gas. 200 g of tertiary butanol and 0.4 g of potassium hydroxide (KOH), as a catalyst, were introduced into the reactor. A solution in the reactor was stirred, and an internal temperature of the reactor was elevated up to 70° C. while continuously supplying nitrogen gas thereto. After the internal temperature of the reactor reached 70° C., an ethylene oxide (hereinafter referred to as "EO") gas was introduced into the reactor at a rate of 30 g/h until a final amount reached 250 g while controlling the internal pressure of the reactor. After introducing the EO gas, the internal temperature of the reactor was elevated up to 125° C., and 630 g of EO was fed thereinto. Next, the internal pressure of the reactor was maintained at 2 to 4 kg/cm² for 8 hours while maintaining the reactor temperature. Next, the temperature of the reactor was elevated to 135° C. and maintained for 1 hour, followed by cooling the reactor and removing unreacted EO. Generated tertiary butoxy PEG 400 was collected.

1-2. Tertiary Butoxy PEG 2000 Synthesis

Tertiary butoxy PEG 2000 was synthesized according to Reaction Scheme 1-2 below:

[Reaction Scheme 1-2]

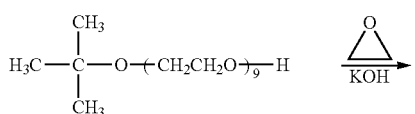

[Tertiary butoxy PEG 400]

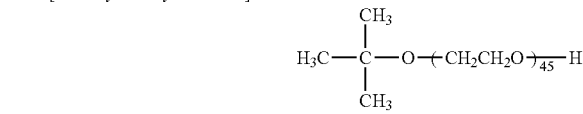

[Tertiary butoxy PEG 2000]

In particular, a 10 L reactor was washed with water and dried, and then filled with nitrogen gas. An internal temperature of the reactor was set to 70° C. 200 g of the tertiary butoxy PEG 400 synthesized in Example 1-1 was melted in an oven, which had been set to 70° C., and then was introduced into the reactor. A solution in the reactor was stirred, and an internal temperature of the reactor was elevated up to 100° C. while continuously supplying nitrogen gas thereto. After the internal temperature of the reactor reached 100° C., EO gas was introduced into the reactor at a rate of 60 g/h until a final amount reached 800 g. After introducing the EO gas, the internal temperature of the reactor was elevated up to 125° C., and an internal pressure of the reactor was maintained at 2 to 4 kg/cm² for 8 hours while maintaining the reactor temperature. Next, the temperature of the reactor was elevated to 135° C. and maintained for 1 hour, followed by cooling the reactor and removing unreacted EO by means of a vacuum pump. Generated tertiary butoxy PEG 2000 was collected.

1-3. Tertiary Butoxy PEG 5000 Synthesis

Tertiary butoxy PEG 5000 was synthesized according to Reaction Scheme 1-3 below:

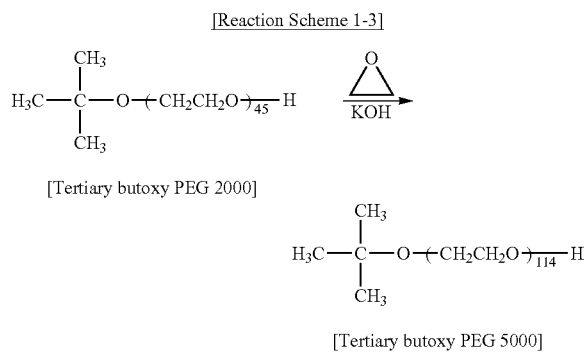

[Reaction Scheme 1-3]

[Tertiary butoxy PEG 2000]

[Tertiary butoxy PEG 5000]

In particular, a 10 L reactor was washed with water and dried, and then filled with nitrogen gas. An internal temperature of the reactor was set to 70° C. 800 g of the tertiary butoxy PEG 2000 synthesized in Example 1-2 was melted in an oven, which had been set to 70° C., and then was introduced into the reactor. A solution in the reactor was stirred, and an internal temperature of the reactor was elevated up to 100° C. while continuously supplying nitrogen gas thereto. After the internal temperature of the reactor reached 100° C., EO gas was introduced into the reactor at a rate of 200 g/h until a final amount reached 1,200 g. After introducing the EO gas, the internal temperature of the reactor was elevated up to 125° C., and an internal pressure of the reactor was maintained at 2 to 4 kg/cm² for 8 hours while maintaining the reactor temperature. Next, the temperature of the reactor was elevated to 135° C. and maintained for 1 hour, followed by cooling the reactor until 90° C. and removing unreacted EO by means of a vacuum pump. For neutralization, 1.6 g of acetic acid was added to the reactor, followed by stirring for 20 minutes. Generated tertiary butoxy PEG 5000 (Compound 1) was collected.

Example 2: Tertiary Butoxy PEG-Acrylate 5000 Synthesis 100 g of tertiary butoxy PEG 5000 was dissolved in 500 ml of methylene chloride, and then 8.4 ml of trimethylamine was added thereto. Next, 3.3 ml of acryloyl chloride was added thereto dropwise at 0° C., and then a reaction was allowed to proceed by stirring at room temperature for 15 to 20 hours. Deionized water was added to the resultant mixture, and an organic layer was extracted therefrom. Methylene chloride was added to an aqueous layer thereof, and an organic layer was re-extracted. A solvent in the extracted organic layer was dried using magnesium sulfate (MgSO₄), followed by concentration and then solidification with diethylether. A solidified product was filtered and vacuum-dried at room temperature for 24 hours. As a result, tertiary butoxy PEG-acrylate 5000 (Compound 2) was obtained.

Example 3: Tertiary Butoxy PEG-Methacrylate 5000 Synthesis

Tertiary butoxy PEG-OH was dissolved in 500 ml of methylene chloride, and then 13.8 ml of trimethylamine was added thereto. Next, 7.8 ml of acryloyl chloride was added thereto dropwise at 0° C., and a reaction was allowed to proceed by stirring at room temperature for 15 to 20 hours. Deionized water was added to the resultant mixture to extract an organic layer. Methylene chloride was added to an aqueous layer, the organic layer was re-extracted therefrom once more. A solvent in the extracted organic layer was dried using magnesium sulfate, followed by concentration and then solidification with diethylether. A precipitated product was filtered, and vacuum drying was performed at room temperature for 24 hours. As a result, tertiary butoxy PEG-methacrylate 5000 (Compound 3) was obtained.

Example 4: Tertiary Butoxy PEG-Aldehyde 5000 Synthesis 5.3 ml of oxalyl chloride was added while stirring 200 ml of methylene chloride at −78° C. Next, 8.4 ml of dimethyl sulfoxide (DMSO) was slowly added to the mixture dropwise for 30 minutes while stirring. 100 g of tertiary butoxy PEG 5000, which had been previously dissolved in 200 ml of methylene chloride, was added to the resultant mixture, followed by stirring at −78° C. for 30 minutes. The temperature of the resultant mixture was warmed to room temperature, and the mixture was stirred for 10 minutes. 42 ml of triethylamine was added to the mixture, followed by stirring at room temperature for 30 minutes. Next, deionized water was added to the resultant mixture, and 2N hydrochloric acid (HCl) was added thereto to adjust the pH of the mixture to 2. Next, a cold aqueous sodium hydrogen carbonate (NaHCO₃) solution was added to the mixture to neutralize the mixture to pH 7. A product was extracted twice with methylene chloride, and then an organic layer was dried with magnesium sulfate, followed by concentration and then solidification with diethylether. A precipitated product was filtered and vacuum-dried at room temperature for 24 hours. As a result, tertiary butoxy PEG-aldehyde 5000 (Compound 4) was obtained.

Example 5: Tertiary Butoxy PEG-Butyraldehyde 5000 Synthesis 100 g of tertiary butoxy PEG 5000 and 14.4 g of sodium hydride (NaH) were dissolved in 1,000 ml of 1,4-dioxane, followed by stirring at a reflux temperature of 1,4-dioxane for 3 hours. 18 g of 3-(2,2-dimethyl-1,3-dioxolan-4-yl) propyl methanesulfonate, as mesylated acetonide, was added to the resultant mixture, followed by additionally stirring at the reflux temperature of 1,4-dioxane for 16 to 18 hours. Next, the resultant mixture was dried by evaporating a solvent therein, and a residue was dissolved in deionized water. When layer separation occurred, an aqueous layer was extracted with methylene chloride twice, and an organic layer was collected. The collected organic layer was dried with magnesium sulfate and concentrated, followed by solidification with diethylether. A precipitated product was filtered and vacuum-dried at room temperature for 24 hours. As a result, tertiary butoxy PEG-acetonide 5000 was obtained.

The tertiary butoxy PEG-acetonide 5000 was dissolved in 1,000 ml of a 1 N hydrochloric acid solution, followed by stirring at room temperature 15 to 20 hours. Next, an aqueous sodium hydrogen carbonate solution was added to the resultant mixture to neutralize the mixture, followed by extraction with methylene chloride twice. A collected organic layer was dried with magnesium sulfate and then concentrated, followed by solidification with diethylether. A precipitated product was filtered and vacuum-dried at room temperature for 24 hours. As a result, tertiary butoxy PEG-1,2-pentanediol 5000 was obtained.

The tertiary butoxy PEG-1,2-pentanediol 5,000 was dissolved in 1,000 ml of deionized water, and 5.2 g of sodium periodate (NaIO$_4$) was added thereto, followed by stirring at room temperature for 1 hour. Deionized water was added to the resultant mixture. Methylene chloride was added to an aqueous layer, followed by mixing such that layer separation occurred. Deionized water was added to an organic layer, followed by mixing such that layer separation occurred. The organic layer was collected. The collected organic layer was dried with magnesium sulfate and concentrated, followed by solidifying with diethylether. A precipitated product was filtered and vacuum-dried at room temperature for 24 hours. As a result, tertiary butoxy PEG-butyraldehyde 5000 (Compound 5) was obtained.

Example 6: Tertiary Butoxy PEG-Propionaldehyde 5000 Synthesis 100 g of tertiary butoxy PEG 5000 and 14.4 g of sodium hydride (NaH) were dissolved in 1,000 ml of 1,4-dioxane, followed by stirring at a reflux temperature of 1,4-dioxane for 3 hours. 18 g of 2-(2,2-dimethyl-1,3-dioxolan-4-yl)propyl methanesulfonate, as mesylated acetonide, was added to the resultant mixture, followed by additionally stirring at the reflux temperature of 1,4-dioxane for 16 to 18 hours. Next, the resultant mixture was dried by evaporating a solvent therein, and a residue was dissolved in deionized water. When layer separation occurred, an aqueous layer was extracted with methylene chloride twice, and an organic layer was collected. The collected organic layer was dried with magnesium sulfate and concentrated, followed by solidification with diethylether. A precipitated product was filtered and vacuum-dried at room temperature for 24 hours. As a result, tertiary butoxy PEG-acetonide 5000 was obtained.

The tertiary butoxy PEG-acetonide 5000 was dissolved in 1,000 ml of a 1 N hydrochloric acid solution, followed by stirring at room temperature 15 to 20 hours. Next, an aqueous sodium hydrogen carbonate solution was added to the resultant mixture to neutralize the mixture to pH 7, followed by extraction with methylene chloride twice. A collected organic layer was dried with magnesium sulfate and then concentrated, followed by solidification with diethylether. A precipitated product was filtered and vacuum-dried at room temperature for 24 hours. As a result, tertiary butoxy PEG-1,2-butanediol 5000 was obtained.

The tertiary butoxy PEG-1,2-butanediol 5000 was dissolved in 1,000 ml of deionized water, and 5.2 g of sodium periodate was added thereto, followed by stirring at room temperature for 1 hour. Deionized water was added to the resultant mixture. Methylene chloride was added to an aqueous layer, followed by mixing such that layer separation occurred. Deionized water was added to an organic layer, followed by mixing such that layer separation occurred. The organic layer was collected. The collected organic layer was dried with magnesium sulfate and concentrated, followed by solidifying with diethylether. A precipitated product was filtered and vacuum-dried at room temperature for 24 hours. As a result, tertiary butoxy PEG-propionaldehyde 5000 (Compound 6) was obtained.

Example 7: Tertiary Butoxy PEG-Benzotriazol Carbonate 5000 Synthesis 100 g of tertiary butoxy PEG 5000 was dissolved in 600 ml of acetonitrile, and then 65 ml of pyridine was added thereto, followed by stirring at room temperature for 30 minutes. 60 g of di(1-benzotriazolyl)carbonate was added to the resultant mixture, followed by stirring at room temperature for 3 hours. Next, the resultant mixture was filtrated with a pyridine salt, and the reaction solvent was dried through evaporation. A crude product was dissolved in deionized water, and then extracted with methylene chloride twice, thereby an organic layer was collected. The collected organic layer was dried with magnesium sulfate and concentrated, followed by solidification with diethylether. A precipitated product was filtered and dissolved in ethyl acetate for re-crystallization, followed by vacuum-drying at room temperature for 24 hours. As a result, tertiary butoxy PEG-benzotriazol carbonate 5000 (Compound 7) was obtained.

Example 8: Tertiary Butoxy PEG-Nitrophenyl Carbonate 5000 Synthesis 100 g of tertiary butoxy PEG 5000 was dissolved in 500 ml of methylene chloride. Next, 7 ml of trimethylamine was added to the resultant mixture, and 8 g of p-nitrophenyl chloroformate was added thereto at 0 to 5° C. The resultant mixture was stirred at room temperature for 20 to 24 hours, and then extracted with methylene chloride to collect an organic layer. The collected organic layer was dried with magnesium sulfate and concentrated, followed by solidification with diethylether. A precipitated product was filtered, and vacuum-dried at room temperature for 24 hours. As a result, tertiary butoxy PEG-nitrophenyl carbonate 5000 (Compound 8) was obtained.

Example 9: Tertiary Butoxy PEG-Succinimidyl Carbonate 5000 Synthesis 100 g of tertiary butoxy PEG 5000 was dissolved in 500 ml of 1,4-dioxane, and 100 g of disuccinimidyl carbonate (DSC) and 14.6 g of dimethyl aminopyridine (DMAP) were added thereto. The resultant mixture was stirred at 30 to 40° C. for 20 to 24 hours, and then dried by evaporating a solvent therein. A residue was dissolved in ethyl acetate and re-crystallized. A resultant product was collected through filtration and washed with diethylether. Next, a resultant product was vacuum-dried at room temperature for 24 hours. As a result, tertiary butoxy PEG-succinimidyl carbonate 5000 (Compound 9) was obtained.

Example 10: Tertiary Butoxy PEG-Succinimidyl Glutarate 5000 Synthesis 100 g of tertiary butoxy PEG 5000 was dissolved in 500 ml of methylene chloride, and then 16.7 ml of trimethylamine was added thereto, and then 11.4 ml of glutaric anhydride was added thereto at room temperature. The resultant mixture was stirred at room temperature for 20 to 24 hours and washed with deionized water. When layer separation occurred, an organic layer was collected, and an aqueous layer was extracted with methylene chloride. The collected organic layer was dried with magnesium sulfate and concentrated, followed by solidification with diethylether. A precipitated product was filtered, and vacuum-dried at room temperature for 24 hours. As a result, tertiary butoxy PEG-glutaric acid 5000 was obtained.

The tertiary butoxy PEG-glutaric acid 5000 was dissolved in 300 ml of methylene chloride, and 4.6 g of n-hydroxyl succinimide (NHS) and 8.25 g of dicyclohexyl carbodiimide (DCC) were added thereto. The resultant mixture was stirred at room temperature for 15 to 20 hours, and then filtered. A solvent in the resultant filtrate was concentrated, and then the filtrate was solidified with diethylether. A precipitated product was dissolved in ethyl acetate and re-crystallized. Next, a resultant product was collected through filtration and washed with diethylether, followed by vacuum-drying at room temperature for 24 hours. As a result, tertiary butoxy PEG-succinimidyl glutarate 5000 (Compound 10) was obtained.

Example 11: Tertiary Butoxy PEG-Succinimidyl Propionate 5000 Synthesis 100 g of tertiary butoxy PEG 5000 was dissolved in 500 ml of deionized water, and 3.4 g of potassium hydroxide (KOH) was added thereto at room temperature. 19.5 ml of acrylonitrile was added to the resultant mixture dropwise at room temperature for 3 hours, followed by stirring at room temperature for 2 days. Next, sodium phosphate was added to the resultant mixture to neutralize to pH 7. A product was extracted twice with methylene chloride. An organic layer was dried with magnesium sulfate and concentrated, followed by solidification with diethylether. A solidified product was filtered and vacuum-dried at room temperature for 24 hours. As a result, tertiary butoxy PEG-propionitrile 5000 was obtained.

The tertiary butoxy PEG-propionitrile 5000 was dissolved in 300 ml of a concentrated hydrochloric acid solution, followed by stirring at room temperature for 6 days. Next, the resultant solution was diluted with deionized water and was subjected to extraction twice with methylene chloride. An organic layer was (hied with magnesium sulfate and concentrated, followed by solidification with diethylether. A solidified product was filtered and vacuum-dried at room temperature for 24 hours. As a result, tertiary butoxy PEG-propionamide 5000 was obtained.

The tertiary butoxy PEG-propionamide 5000 was dissolved in 400 ml of an aqueous 10% potassium hydroxide solution, followed by stirring at room temperature for 20 to 24 hours. Next, concentrated hydrochloric acid was added to the resultant mixture to adjust the pH thereof to 2, followed by extracting twice with methylene chloride. Next, an organic layer was dried with magnesium sulfate and concentrated, followed by solidification with diethylether. A precipitated product was filtered and vacuum-dried at room temperature for 24 hours. As a result, tertiary butoxy PEG-propionic acid 5000 was obtained.

The tertiary butoxy PEG-propionic acid 5000 was dissolved in 300 ml of methylene chloride, and then 4.6 g of n-hydroxyl succinimide (NHS) and 9.3 g of dicyclohexyl carbodiimide (DCC) were added thereto, followed by stirring at room temperature for 15 to 20 hours. Next, the resultant mixture was filtered. A solvent in the resultant filtrate was concentrated, and then the filtrate was solidified with diethylether. A solidified product was filtered, and then dissolved in ethyl acetate to be re-crystallized. The re-crystallized product was filtered, and then washed with diethylether, followed by vacuum-drying at room temperature for 24 hours. As a result, tertiary butoxy PEG-succinimidyl propionate 5000 (Compound 11) was obtained.

Example 12: Tertiary Butoxy PEG-Succinimidyl Succinate 5000 Synthesis 100 g of tertiary butoxy PEG 5,000 was dissolved in 500 ml of methylene chloride, and then 16.7 ml of trimethylamine was added thereto and 10 g of succinic anhydride was added thereto at room temperature. Next, the resultant mixture was stirred at room temperature for 20 to 24 hours, and then was washed with deionized water. When layer separation occurred, an aqueous layer was extracted with methylene chloride, and an organic layer was collected, dried with magnesium sulfate, and concentrated, followed by solidification with diethylether. A precipitated product was filtered, and vacuum-dried at room temperature for 24 hours. As a result, tertiary butoxy PEG-succinic acid 5000 was obtained.

The tertiary butoxy PEG-succinic acid 5000 was dissolved in 300 ml of methylene chloride, and 4.6 g of n-hydroxyl succinimide (NHS) and 8.3 g of dicyclohexyl carbodiimide (DCC) were added thereto. A resultant mixture was stirred at room temperature for 15 to 20 hours, and then filtered. A solvent in a resultant filtrate was concentrated, and then the filtrate was solidified with diethylether. A solidified product was filtered, and then dissolved in ethyl acetate to be re-crystallized. The crystallized product was filtered and washed with diethylether. Next, a resultant product was vacuum-dried at room temperature for 24 hours. As a result, tertiary butoxy PEG-succinimidyl succinate 5000 (Compound 12) was obtained.

Example 13: Tertiary Butoxy PEG-Epoxide 5000 Synthesis 100 g of tertiary butoxy PEG 5000 was melted at 60° C., and 4.8 g of sodium hydroxide (NaOH) and 0.7 ml of deionized water were added thereto. 23.5 ml of epichlorohydrine and 0.11 g of 2,6-di-tert-butyl-4-methylphenol (BHT) were added to the resultant mixture, followed by stirring at 60 to 65° C. for 15 to 20 hours. Next, the resultant mixture was cooled until room temperature and dissolved in deionized water. The resultant mixture was extracted twice with methylene chloride, and an organic layer was separated therefrom, dried with magnesium sulfate, and concentrated, followed by solidification with diethylether. A precipitated product was filtered, and vacuum-dried at room temperature for 24 hours. As a result, tertiary butoxy PEG-epoxide 5000 (Compound 13) was obtained.

Example 14: Tertiary Butoxy PEG-Amine 5000 Synthesis 100 g of tertiary butoxy PEG 5000 was dissolved in 800 ml of methylene chloride, and then 16.7 ml of trimethylamine was added thereto. 19 g of p-toluenesulfonyl chloride was added to the resultant mixture at room temperature. The resultant mixture was stirred at room temperature for 24 hours, and then deionized water was added thereto. When layer separation occurred, an aqueous layer was extracted with methylene chloride, and an organic layer was collected, dried with magnesium sulfate, and concentrated, followed by solidification with diethylether. A precipitated product was filtered, and vacuum-dried at room temperature for 24 hours. As a result, tertiary butoxy PEG-tosylate 5000 was obtained.

The tertiary butoxy PEG-tosylate 5000 was dissolved in methylene chloride, and then 2,500 ml of 28% ammonia water was added thereto in a closed system, followed by stirring at room temperature. A product was extracted with methylene chloride twice, and an organic layer was collected. The collected organic layer was dried with magnesium sulfate and concentrated, followed by solidification with diethylether. A precipitated product was filtered, and vacuum-dried at room temperature for 24 hours. As a result, tertiary butoxy PEG-amine 5000 (Compound 14) was obtained.

Example 15: Tertiary Butoxy PEG-Maleimide 5000 Synthesis

Tertiary butoxy PEG-amine was dissolved in a mixed solvent of 400 ml of N,N-dimethyl-acetamide (DMAC) and 80 ml of 1-cychlohexyl-2-pyrrolidinone, and 19.6 g of maleic anhydride was added thereto, followed by stirring at 80 to 90° C. for 16 to 18 hours. Next, the resultant mixture was cooled, and diethylether was added thereto for precipitation. A precipitate was collected through filtration and washed with diethylether three times, followed by vacuum-drying at room temperature for 24 hours. As a result, tertiary butoxy PEG-maleamic acid 5000 was obtained.

The tertiary butoxy PEG-maleamic acid 5000 was dissolved in a mixed solvent of 300 ml of methylene chloride and 75 ml of N,N-dimethylformamide (DMF), and 8.7 ml of N,N-diisopropylethyl amine (DIEA) was added thereto, followed by stirring at 0° C. for 10 minutes. Next, 8.61 ml of pentafluorophenyl trifluoroacetate (PFP-TFA) was slowly added to the resultant mixture dropwise over 30 minutes, followed by stirring at 0° C. for 30 minutes. Next, the resultant mixture was refluxed at 50 to 60° C. for 20 to 24 hours and cooled until room temperature. A solvent in the resultant mixture was removed in a vacuum state, and diethylether was added thereto for precipitation. The resultant mixture was filtered to collect a precipitate. The collected precipitate was washed with diethylether three times, and then vacuum-dried at room temperature for 24 hours. As a result, tertiary butoxy PEG-maleimide 5000 (Compound 15) was obtained.

Example 16: Tertiary Butoxy PEG-Sulfhydryl 5000 Synthesis 100 g of tertiary butoxy PEG 5000 was dissolved in 800 ml of deionized water, and then the resultant solution was degassed by bubbling nitrogen gas for 1 hour. 100.5 g of thiourea was added thereto, followed by stirring at a reflux temperature for 15 to 20 hours. Next, 800 nil of a 1 N sodium hydroxide (NaOH) solution was added to the resultant mixture, followed by stirring at a reflux temperature for 2 hours and the resultant mixture was cooled until room temperature. The resultant mixture was extracted with methylene chloride twice, and an organic layer thereof was dried with magnesium sulfate and concentrated, followed by solidification with diethylether. A precipitated product was filtered, and vacuum-dried at room temperature for 24 hours. As a result, tertiary butoxy PEG-sulfhydryl 5000 (Compound 16) was obtained.

Example 17: 3-Ethyl 3-Pentoxy PEG 5000 Synthesis

17-1. 3-Ethyl 3-Pentoxy PEG 400 Synthesis 3-ethyl 3-pentoxy PEG 400 was synthesized according to Reaction Scheme 2-1 below:

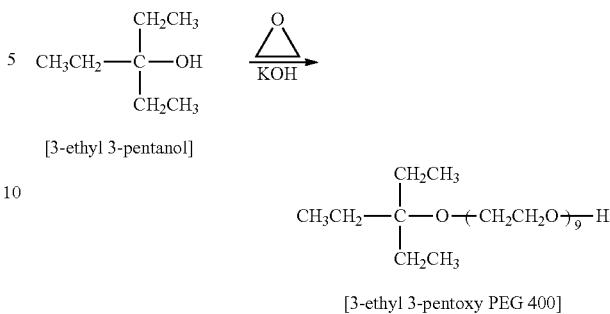

[Reaction Scheme 2-1]

Particularly, a 10 L reactor was washed with water and dried, and then filled with nitrogen gas. 200 g of 3-ethyl 3-pentanol and 0.4 g of potassium hydroxide (KOH), as a catalyst, were introduced into the reactor. A solution in the reactor was stirred, and an internal temperature of the reactor was elevated up to 70° C. while continuously supplying nitrogen gas thereto. After the internal temperature of the reactor reached 70° C., EO gas was introduced into the reactor at a rate of 30 g/h until a final amount reached 250 g while controlling an internal pressure of the reactor. After introducing the EO gas, the internal temperature of the reactor was elevated up to 125° C., and 630 g of EO was added to the reactor. Next, an internal pressure of the reactor was maintained at 2 to 4 kg/cm² for 8 hours while maintaining the reactor temperature. Next, the temperature of the reactor was elevated to 135° C. and maintained for 1 hour, followed by cooling the reactor and removing unreacted EO. Generated 3-ethyl 3-pentoxy PEG 400 was collected.

17-2. 3-ethyl 3-pentoxy PEG 2000 synthesis 3-ethyl 3-pentoxy PEG 2000 was synthesized according to Reaction Scheme 2-2 below:

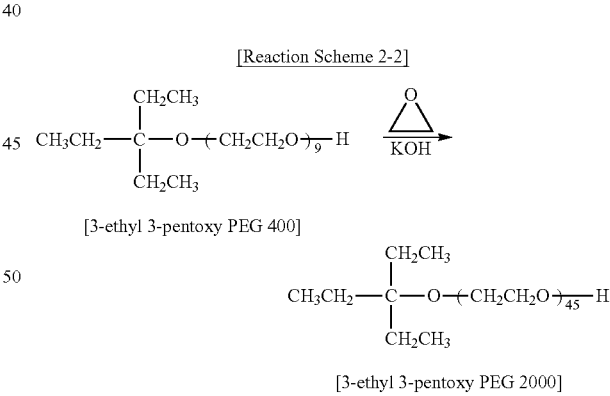

[Reaction Scheme 2-2]

A 10 L reactor was washed with water and dried, and then filled with nitrogen gas. An internal temperature of the reactor was set to 70° C. 200 g of the 3-ethyl 3-pentoxy PEG 400 synthesized in Example 2-1 was melted in an oven, which had been set to 70° C., and then was introduced into the reactor. A solution in the reactor was stirred, and an internal temperature of the reactor was elevated up to 100° C. while continuously supplying nitrogen gas thereto. After the internal temperature of the reaction reached 100° C., EO gas was introduced into the reactor at a rate of 60 g/h until a final amount reached 800 g. After introducing the EO gas, the internal temperature of the reactor was elevated up to 125° C., and an internal pressure of the reactor was maintained at a pressure of 2 to 4 kg/cm² for 8 hours while maintaining the reactor temperature. Next, the temperature of the reactor was elevated to 135° C. and maintained for 1 hour, followed by cooling the reactor and removing unreacted EO by means of a vacuum pump. Generated 3-ethyl 3-pentoxy PEG 2000 was collected.

17-3. 3-ethyl 3-pentoxy PEG 5000 synthesis 3-ethyl 3-pentoxy PEG 5000 was synthesized according to Reaction Scheme 2-3 below:

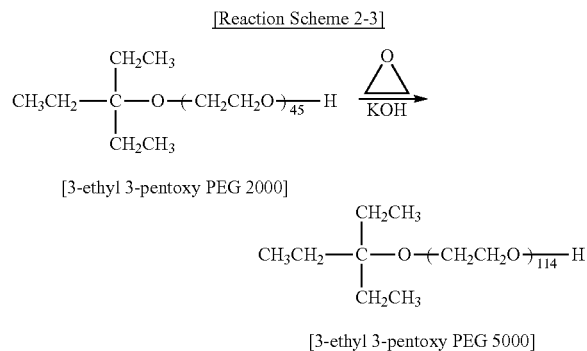

[Reaction Scheme 2-3]

[3-ethyl 3-pentoxy PEG 2000]

[3-ethyl 3-pentoxy PEG 5000]

A 10 L reactor was washed with water and dried, and then filled with nitrogen gas. An internal temperature of the reactor was set to 70° C. 800 g of the 3-ethyl 3-pentoxy PEG 2000 synthesized in Example 2-2 was melted in an oven, which had been set to 70° C., and then was introduced into the reactor. A solution in the reactor was stirred, and an internal temperature of the reactor was elevated up to 100° C. while continuously supplying nitrogen gas thereto. After the internal temperature of the reactor reached 100° C., EO gas was introduced into the reactor at a rate of 200 g/h until a final amount reached 1,200 g. After introducing the EO gas, the internal temperature of the reactor was elevated up to 125° C., and an internal pressure of the reactor was maintained at 2 to 4 kg/cm² for 8 hours while maintaining the reactor temperature. Next, the temperature of the reactor was elevated to 135° C. and maintained for 1 hour, followed by cooling the reactor until 90° C. and removing unreacted EO by means of a vacuum pump. 1.6 g of acetic acid was added to the reactor, followed by stirring for 20 minutes. As a result, generated 3-ethyl 3-pentoxy PEG 5000 (Compound 17) was collected.

The tertiary alkoxy compounds synthesized in Example 1 to 17 are summarized in Table 1 below.

TABLE 1

| Example | Compound | Name |
|---|---|---|
| 1 | H₃C—C(CH₃)(CH₃)—O—(CH₂CH₂O)₁₁₄—H | Tertiary butoxy PEG 5000 |
| 2 | H₃C—C(CH₃)(CH₃)—O—(CH₂CH₂O)₁₁₄—C(=O)—CH=CH₂ | Tertiary butoxy PEG-acrylate 5000 |
| 3 | H₃C—C(CH₃)(CH₃)—O—(CH₂CH₂O)₁₁₄—C(=O)—C(CH₃)=CH₂ | Tertiary butoxy PEG-methacrylate 5000 |
| 4 | H₃C—C(CH₃)(CH₃)—O—(CH₂CH₂O)₁₁₄—CH₂—C(=O)H | Tertiary butoxy PEG-aldehyde 5000 |
| 5 | H₃C—C(CH₃)(CH₃)—O—(CH₂CH₂O)₁₁₄—CH₂CH₂CH₂—C(=O)H | Tertiary butoxy PEG-butyraldehyde 5000 |
| 6 | H₃C—C(CH₃)(CH₃)—O—(CH₂CH₂O)₁₁₄—CH₂CH₂—C(=O)H | Tertiary butoxy PEG-propionaldehyde 5000 |

TABLE 1-continued

| Example | Compound | Name |
|---|---|---|
| 7 | 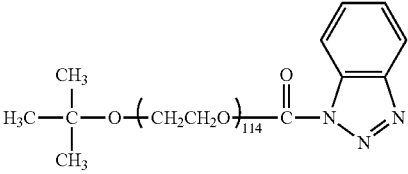 | Tertiary butoxy PEG-benzotriazolyl carbonate 5000 |
| 8 | 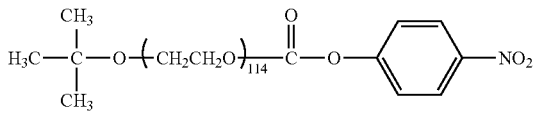 | Tertiary butoxy PEG-nitrophenyl carbonate 5000 |
| 9 | 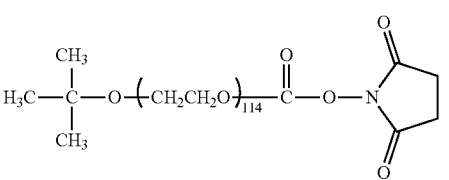 | Tertiary butoxy PEG-succinimidyl carbonate 5000 |
| 10 | 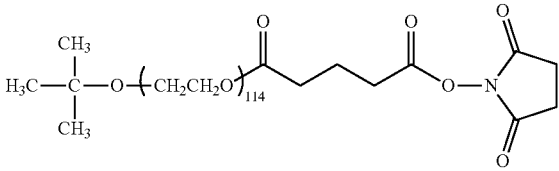 | Tertiary butoxy PEG-succinimidyl glutarate 5000 |
| 11 | 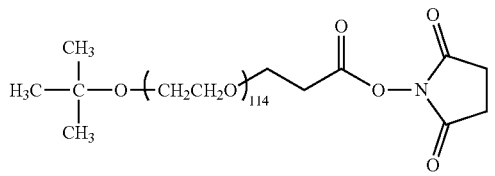 | Tertiary butoxy PEG-succinimidyl propionate 5000 |
| 12 | 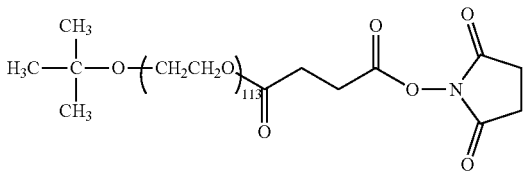 | Tertiary butoxy PEG-succinimidyl succinate 5000 |
| 13 | 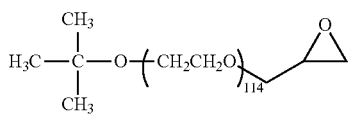 | Tertiary butoxy PEG-epoxide 5000 |
| 14 | 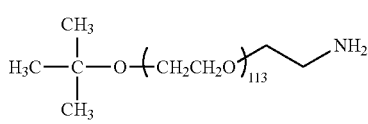 | Tertiary butoxy PEG-amine 5000 |
| 15 | 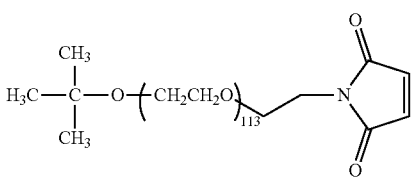 | Tertiary butoxy PEG-maleimide 5000 |

TABLE 1-continued

| Example | Compound | Name |
|---|---|---|
| 16 | 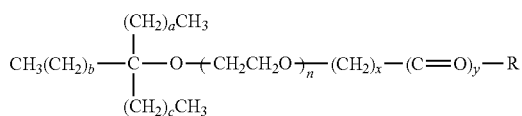 | Tertiary butoxy PEG-sulfhydryl 5000 |
| 17 | H₃C—C(CH₃)(CH₃)—O—(CH₂CH₂O)₁₁₄—H | 3-ethyl 3-pentoxy PEG 5000 |

What is claimed is:

1. Tertiary alkoxy polyethylene glycol represented by Formula 1 below and derivatives thereof:

[Formula 1]

$$CH_3(CH_2)_b-\underset{(CH_2)_cCH_3}{\overset{(CH_2)_aCH_3}{\underset{|}{\overset{|}{C}}}}-O-(CH_2CH_2O)_n-(CH_2)_x-(C=O)_y-R$$

wherein a, b and c are independently an integer of 0 to 10,
n is an integer of 2 to 10,000,
x and y are independently an integer of 0 to 10; and
R is selected from the group consisting of hydrogen, a substituted or unsubstituted vinyl group, an amine group, a C2-C20 heterocyclic group, and a thiol group.

2. The tertiary alkoxy polyethylene glycol according to claim 1, wherein, in Formula 1,
a, b and c are independently an integer of 0 to 5,
n is an integer of 2 to 10,000,
x and y are independently an integer of 0 to 5; and
R is selected from the group consisting of hydrogen, a substituted or unsubstituted vinyl group, an amine group, a C2-C20 heteroaryl group, a C2-C10 heterocyclic group, a C2-C10 cyclic imide group, a substituted or unsubstituted aryl group, a C2-C10 alkyl-(C=O)-succinimidyl group, and a thiol group.

3. The tertiary alkoxy polyethylene glycol according to claim 1, wherein, when x is 0 in Formula 1,
a, b and c are independently an integer of 0 to 3,
n is an integer of 2 to 10,000,
y is an integer of 0 or 1; and
R is selected from the group consisting of hydrogen, a substituted or unsubstituted vinyl group, a C2-C20 heteroaryl group, a C2-C10 cyclic imide group, a substituted or unsubstituted aryl group, and a C2-C10 alkyl-(C=O)-succinimidyl group.

4. The tertiary alkoxy polyethylene glycol according to claim 3, wherein the compound represented by Formula 1 is selected from the group consisting of:

tertiary alkoxy PEG;
tertiary alkoxy PEG-acrylate;
tertiary alkoxy PEG-benzotriazolyl carbonate'
tertiary alkoxy PEG-methacrylate;
tertiary alkoxy PEG-nitrophenyl carbonate;
tertiary alkoxy PEG-succinimidyl carbonate;
tertiary alkoxy PEG-succinimidyl glutarate; and
tertiary alkoxy PEG-succinimidyl succinate.

5. The tertiary alkoxy polyethylene glycol according to claim 1, wherein, when x is 1 in Formula 1,
a, b and c are independently an integer of 0 to 3,
n is an integer of 2 to 10,000,
y is an integer of 0 or 1; and
R is a C2-C10 heterocyclic group or hydrogen.

6. The tertiary alkoxy polyethylene glycol according to claim 5, wherein the compound represented by Formula 1 is tertiary alkoxy PEG-aldehyde or tertiary alkoxy PEG-epoxide.

7. The tertiary alkoxy polyethylene glycol according to claim 1, wherein, when x is 2 in Formula 1,
a, b and c are independently an integer of 0 to 3,
n is an integer of 2 to 10,000,
y is an integer of 0 or 1; and
R is an amine group, a C2-C10 cyclic imide group, a thiol group, or hydrogen.

8. The tertiary alkoxy polyethylene glycol according to claim 7, wherein the compound represented by Formula 1 is selected from the group consisting of:
tertiary alkoxy PEG-amine;
tertiary alkoxy PEG-maleimide;
tertiary alkoxy PEG-sulfhydryl;
tertiary alkoxy PEG-propionaldehyde; and
tertiary alkoxy PEG-succinimidyl propionate.

9. The tertiary alkoxy polyethylene glycol according to claim 1, wherein, when x is 3 in Formula 1,
a, b and c are independently an integer of 0 to 3,
n is an integer of 2 to 10,000,
y is 1; and
R is hydrogen.

10. The tertiary alkoxy polyethylene glycol according to claim 9, wherein the compound represented by Formula 1 is tertiary alkoxy PEG-butyraldehyde.

* * * * *